United States Patent
Isberg

(10) Patent No.: US 9,877,105 B2
(45) Date of Patent: Jan. 23, 2018

(54) SYSTEMS, METHODS, AND DEVICES FOR DERIVING SAMPLING CLOCKS FOR MICROPHONES IN A WIRELESS AUDIO SYSTEM

(71) Applicant: Sony Mobile Communications Inc., Tokyo (JP)

(72) Inventor: Peter Isberg, Lund (SE)

(73) Assignee: Sony Mobile Communications Inc., Tokyo (JP)

( * ) Notice: Subject to any disclaimer, the term of this patent is extended or adjusted under 35 U.S.C. 154(b) by 103 days.

(21) Appl. No.: 15/042,389

(22) Filed: Feb. 12, 2016

(65) Prior Publication Data

US 2017/0238092 A1    Aug. 17, 2017

(51) Int. Cl.
| | |
|---|---|
| *H04B 1/00* | (2006.01) |
| *H04R 3/00* | (2006.01) |
| *H04W 56/00* | (2009.01) |
| *H04W 8/00* | (2009.01) |
| *H04W 84/18* | (2009.01) |

(52) U.S. Cl.
CPC ............ *H04R 3/005* (2013.01); *H04W 8/005* (2013.01); *H04W 56/001* (2013.01); *H04R 2420/07* (2013.01); *H04W 84/18* (2013.01)

(58) Field of Classification Search
CPC ........... H04M 1/72572; H04M 1/6505; H04M 1/72533; H04M 19/04; H04M 1/56; H04M 1/575; H04M 2250/60; H04M 1/72522; H04M 3/568; H04M 1/64; H04M 1/72569; H04M 2203/509; H04M 2250/62; H04M 3/002; H04M 3/533; H04M 3/567; H04M 9/082

USPC ... 381/310, 314, 77, 86, 108, 111, 120, 122, 381/17, 23.1, 26, 309, 311, 312, 315, 381/363, 370, 57, 59, 74, 79, 92, 95, 119
See application file for complete search history.

(56) References Cited

U.S. PATENT DOCUMENTS

| | | | | |
|---|---|---|---|---|
| 9,747,919 | B2* | 8/2017 | Matsuo | ............... G10L 21/0208 |
| 2010/0271456 | A1* | 10/2010 | Tsumura | ................. H04N 7/15 |
| | | | | 348/14.08 |
| 2013/0077932 | A1* | 3/2013 | Cornell | ................. H04N 5/232 |
| | | | | 386/227 |
| 2014/0009564 | A1* | 1/2014 | Cleve | .................... H04M 3/002 |
| | | | | 348/14.08 |
| 2015/0099998 | A1* | 4/2015 | Christensen | ......... A61B 5/0002 |
| | | | | 600/586 |

(Continued)

OTHER PUBLICATIONS

Synchronization and Sampling in Wireless Adaptive Signal Processing Systems, Gyorgy Orsosz.*

(Continued)

*Primary Examiner* — Akelaw Teshale
(74) *Attorney, Agent, or Firm* — Myers Bigel, P.A.

(57) ABSTRACT

A wireless audio system includes microphone devices that are established as part of a wireless communication network. A common radio signal is selected by the microphone devices from radio signals available in the environment. Respective sampling clocks are derived by the microphone devices based on the common radio signal. Audio signals are recorded by the microphone devices based on the respective sampling clocks that were derived. Related sampling microphone methods, devices and systems are described.

19 Claims, 15 Drawing Sheets

(56) References Cited

U.S. PATENT DOCUMENTS

2016/0014490 A1* 1/2016 Bar Bracha ............ H04M 3/56
　　　　　　　　　　　　　　　　　　　　　381/92

OTHER PUBLICATIONS

International Search Report and Written Opinion Corresponding to International Application No. PCT/JP2016/000731; dated Aug. 11, 2016; 11 Pages.
Orosz et al. "Synchronization and Sampling in Wireless Adaptive Signal Processing Systems", *Periodica Polytechnica Electrical Engineering*, vol. 54, No. 1-2, Jan. 2010.

* cited by examiner

SYSTEMS, METHODS, AND DEVICES FOR DERIVING SAMPLING CLOCKS FOR MICROPHONES IN A WIRELESS AUDIO SYSTEM

FIELD

Various embodiments described herein relate to systems, methods, and devices in a wireless audio system and more particularly to microphone devices in a wireless audio system.

BACKGROUND

Concerts, recitals, and/or other live performances may be enjoyed by patrons in a venue. It may be desired to record the audio of a live performance using one or more audio or video devices. However, the audio quality recorded by a video recorder or a smart phone from a seat location of the user may be poor. It may be desired to record a live performance using multiple microphone devices strategically placed around the performance venue. However, audio signals recorded by the various microphone device may not be synchronized, which may lead to poor playback performance.

SUMMARY

Various embodiments described herein can provide a method of operating a wireless audio system. The method includes establishing a wireless communication network between a plurality of microphone devices in an environment. A common radio signal used by the plurality of microphone devices is selected from a plurality of radio signals available in the environment. Respective sampling clocks are derived by respective ones of the plurality of microphone devices based on the common radio signal. Audio signals may be recorded by the respective ones of the plurality of microphone devices based on the respective sampling clocks.

In some embodiments, selecting the common radio signal may include scanning the environment, by each of the plurality of microphone devices, for the plurality of radio signals available in the environment. The common radio signal may be selected out of the plurality of radio signals. The common radio signal may be selected out of the plurality of radio signals by determining one or more candidate radio signals out of the plurality of radio signals that are identified by each of the plurality of microphone devices during the scanning and selecting the common radio signal out of the one or more candidate radio signals.

In some embodiments, selecting the common radio signal out of the one or more candidate radio signals may include determining respective candidate signal powers received at respective ones of the plurality of microphone devices for each of the one or more candidate radio signals and selecting the common radio signal based on the respective candidate signal powers. Selecting the common radio signal based on the respective candidate signal powers may include determining respective average candidate signal powers associated with respective ones of the one or more candidate radio signals. One of the respective average candidate signal powers for a given candidate radio signal may be based on an average of the candidate signal powers associated with ones of the plurality of microphone devices for the given candidate radio signal. In some embodiments, selecting the common radio signal based on the respective candidate signal powers may include selecting the common radio signal based on the respective candidate signal powers for each of the plurality of microphone devices for one of the one or more candidate radio signals being greater than a threshold.

In some embodiments, selecting the common radio signal out of the one or more candidate radio signals may include providing, to a selection device, information associated with the one or more candidate radio signals and determining the radio signal based on a selection from the selection device. In some embodiments, selecting the common radio signal out of the one or more candidate radio signals may include communicating, using the wireless communication network, by a first microphone device of the plurality of microphone devices to a second microphone device of the plurality of microphone devices. The information may identify at least one of the one or more candidate radio signals visible to the first microphone device, based on the scanning the environment. The second microphone device may determine that one of the at least one of the one or more candidate radio signals visible to the first microphone device is also visible to the second microphone device. The second microphone device selects the one of the at least one of the one or more candidate radio signals as the common radio signal. The second microphone device communicates to the first microphone device, the common radio signal selected by the second microphone device.

In some embodiments, deriving the respective sampling clocks by respective ones of the plurality of microphone devices based on the common radio signal includes negotiating, over the wireless communication network, a common clock divider among the plurality of microphone devices. Each of the plurality of microphone devices may divide the common radio signal by the common clock divider to derive the respective sampling clocks. Negotiating the common clock divider among the plurality of microphone devices may include sending, to a first microphone device of the plurality of microphone devices, from remaining ones of the plurality of microphone devices, respective suggested clock dividers. The first microphone device may select the common clock divider based on the respective suggested clock dividers from the remaining ones of the plurality of microphone devices.

In some embodiments, selecting the common clock divider may include averaging the suggested clock dividers to determine an average clock divider value and rounding the average clock divider value to a whole number to obtain the common clock divider. In some embodiments, selecting the common clock divider may include determining a most commonly occurring clock divider of the suggested clock dividers, and selecting the most commonly occurring clock divide as the common clock divider.

In some embodiments, dividing the common radio signal by the common clock divider to derive the respective sampling clocks may include multiplying, by each of the plurality of microphone devices, the common radio signal by a first integer to obtain respective multiplied radio signals, and dividing, by each of the plurality of microphone devices, the respective multiplied radio signals by a second integer to derive the respective sampling clocks. The common clock divider is a ratio of the first integer to the second integer.

In some embodiments, the method of operating the wireless audio system may include processing the audio signals recorded by the respective ones of the plurality of microphone devices to produce a composite audio track. Processing the audio signals may include aligning the audio signals from the plurality of microphone devices in time based on the respective sampling clocks derived from the common radio signal. The composite audio track is produced based on the audio signals that were aligned.

Various embodiments described herein can provide a system for recording an event. The system includes a plurality of sampling microphone devices. A respective sampling microphone device of the plurality of sampling microphone devices includes a processor that is configured to receive a common radio signal that is received by the plurality of sampling microphone devices at the event. The processor may be configured to synchronize sampling of the respective sampling microphone device based on the common radio signal. The respective sampling microphone device may include a communication interface configured to communicate via a wireless communication network to one or more other sampling microphone devices in an environment. The processor is coupled to the communication interface and is further configured to perform operations including selecting the common radio signal based on a plurality of radio signals available in the environment, deriving a sampling clock based on the common radio signal, wherein the sample clock synchronizes the sampling of the respective sampling microphone device, and recording audio signals by the respective sampling microphone device based on the sampling clock. Other operations according to any of the embodiments described herein may also be performed.

In some embodiments, selecting the common radio signal includes scanning the environment for the plurality of radio signals available in the environment, and determining one or more candidate radio signals out of the plurality of radio signals. Information related to one or more other candidate radio signals may be received by the communication interface from the one or more other microphone devices. A subset of the one or more candidate radio signals that include the one or more other candidate radio signals from the one or more other microphone devices may be determined. The common radio signal may be selected from the subset of the one or more candidate radio signals.

In some embodiments, selecting the common radio signal includes scanning the environment for the plurality of radio signals available in the environment, and determining one or more candidate radio signals out of the plurality of radio signals. Information related to the one or more candidate radio signals may be communicated using the communication interface, to the one or more other microphone devices. A selection of the common radio signal out of the one or more candidate radio signals may be received by the microphone device.

Various embodiments described herein can provide a method of operating a plurality of microphone devices that are in an environment to record an event. The method includes synchronizing sampling frequencies of the plurality of microphone devices to one another using a common radio signal that is received by the plurality of microphone devices. Synchronizing sampling frequencies may include deriving respective sampling frequencies from the common radio signal by respective ones of the plurality of the microphone devices, and using the respective sampling frequencies to sample audio signals from the event by each of the respective ones of the plurality of the microphone devices. Other operations according to any of the embodiments described herein may also be performed.

DETAILED DESCRIPTION

Figure 1:
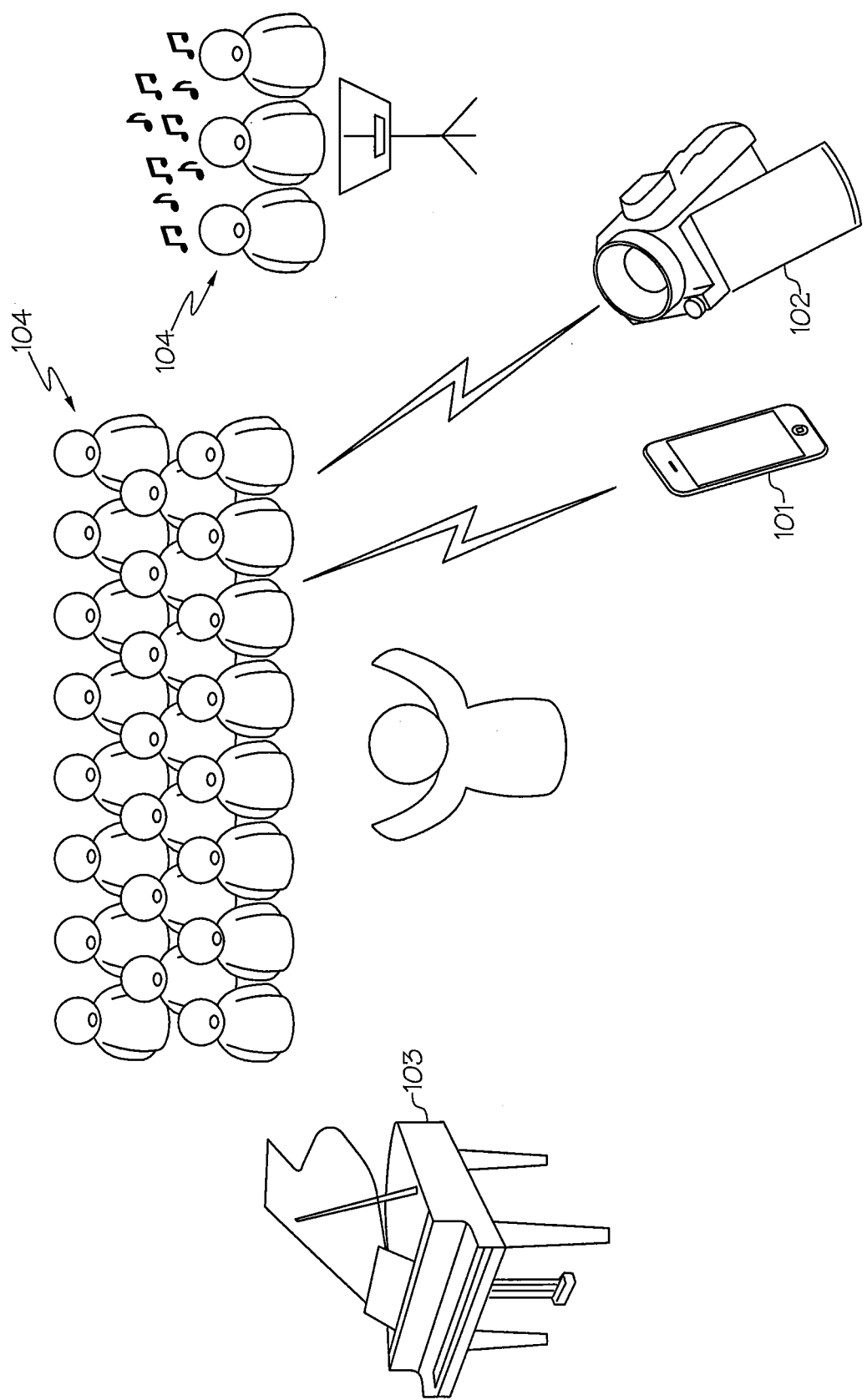
FIG. 1 illustrates a live performance recorded by various devices, according to various embodiments described herein.

Various embodiments will be described more fully hereinafter with reference to the accompanying drawings. Other embodiments may take many different forms and should not be construed as limited to the embodiments set forth herein. Like numbers refer to like elements throughout.

People enjoy various live performances such as concerts, opera, theatrical performances, religious celebrations, and/or recitals. These events may be recorded by audio devices or by video recorders that include recording of the audio track for personal enjoyment after the live performance. Conventionally, these may be a recorded by an audio or video device held by the user at the seat location of the user or placed on a tripod in a location such as aisle. The microphones in audio or video recording devices may include technology to suppress ambient noise or reflections. However, the audio quality may be poor since the audio is recorded in a single location remote from the performers. Furthermore, if multiple recording devices are used, the audio sampling of these microphones may not be synchronized. A professional multi-microphone system may include microphone sampled with the same clock in a single recording device and/or using a single house clock. However, use of the same clock may provide challenges such as providing the same clock to the multiple microphones.

Various embodiments described herein may arise from the recognition that better audio quality may be obtained using multiple microphone devices placed in various locations in the live performance venue whose sampling clocks are synchronized. The microphone devices may be wireless, low-power devices with a small footprint, such as Internet of Things (IoT) devices. Each microphone device may use a local oscillator for sampling the audio signals. Each of the local oscillators may drift in frequency due to tolerances or temperature effects. A drift on the order of several milliseconds may over a recording can be tolerated. However, for a left/right stereo microphone pair, a timing accuracy of <100 μsec may be necessary for proper stereo-quality listening. For example, 350 μsec drift between a left/right stereo microphone pair may displace the stereo image by 45 degrees. For a one hour audio recording, 100 μsec corresponds to about 0.03 ppm of accuracy. Conventional portable audio recorders have a typical clock accuracy in the range of 0.2 ppm to 50 ppm and thus may not be suitable for multiple microphone environment. As described herein, recording devices such as microphone devices may derive sampling clocks from a common source such that the audio signals recorded by the various microphone devices are synchronized with a higher clock accuracy in order to facilitate high-quality playback. As described herein, the microphone devices may include wireless microphones, adaptors that plug into a microphone device, and/or adaptors that plug into a public announcement (PA) system or mixing console. Microphone devices may receive audio from an acoustic signal or may receive analog or digital information in the form of an electrical signals such as output from a keyboard or console. Microphone devices may produce a single mono-audio track, or may produce multiple audio tracks, in the case of a stereo microphone or a surround microphone.

Referring now to FIG. 1, a live performance is illustrated that includes a musical instrument such as a piano 103 and singers 104. A smart phone 101 or a video recorder 102 may record the live performance. However, the recorded audio quality may be poor since the audio is recorded in at a seat location of the user, remote from the performers.

Figure 2:
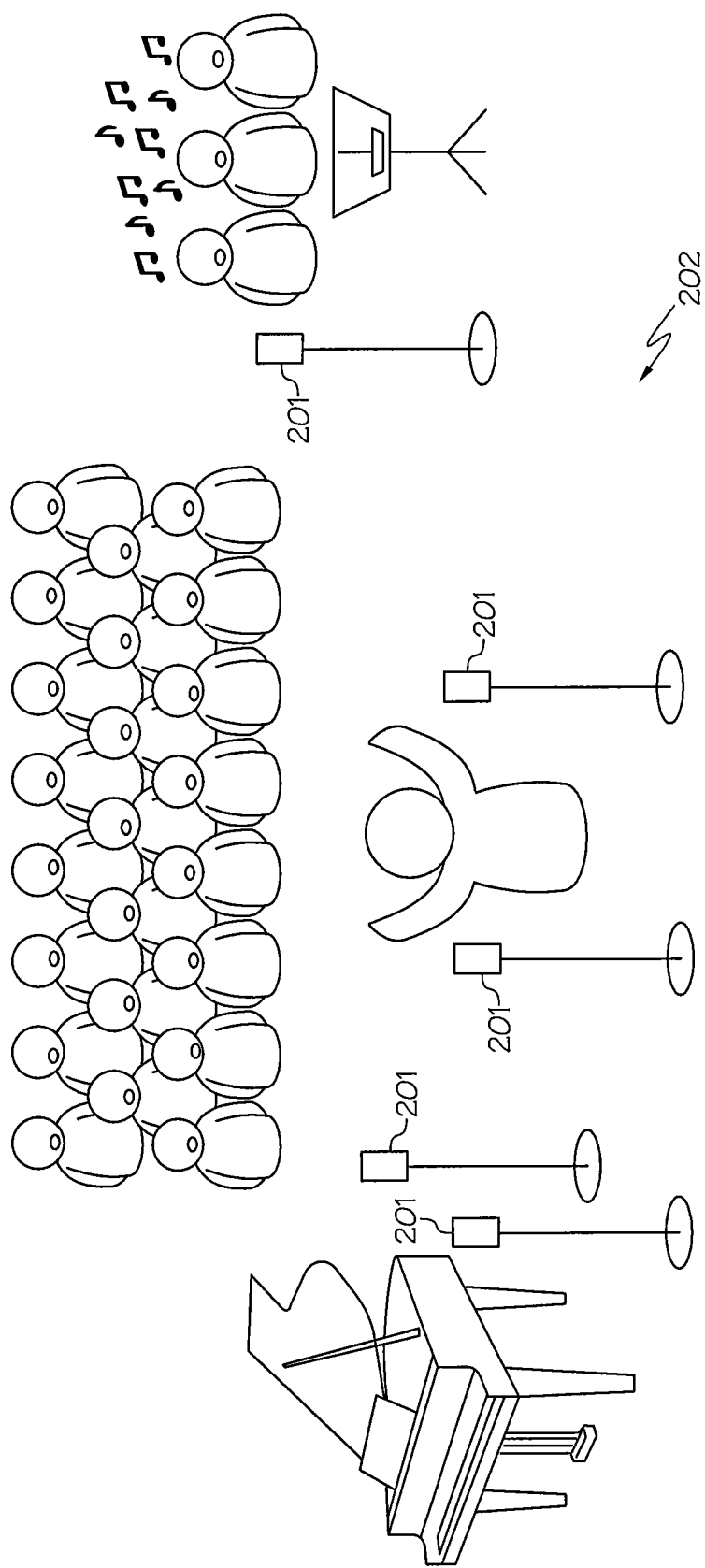
FIG. 2 illustrates a live performance being recorded by a plurality of microphone devices, according to various embodiments described herein.

Referring now to FIG. 2, the live performance of FIG. 1 may be recorded by a plurality of microphone devices 201, according to various embodiments described herein. The microphone devices 201 may be placed at various locations in the performance venue environment 202 to obtain audio signals from instruments and singers.

Figure 3:
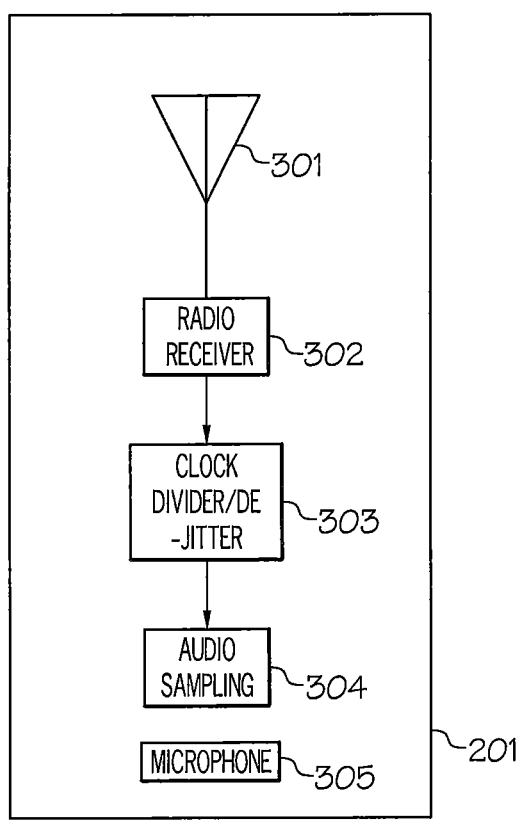
FIG. 3 is a block diagram of a microphone device, according to various embodiments described herein.

Referring now to FIG. 3, a block diagram of the microphone device 201 of FIG. 2 is illustrated. The microphone device may include an antenna 301 to receive audio signals from the environment of the live performance venue. The antenna 301 may be electrically connected to a radio receiver 302 that processes the signal received by the antenna 301. The received signals at the radio receiver 302 may be input to a clock divider and/or de-jitter circuit 303. The clock divider and/or de jitter circuit 303 may divide a common radio signal to derive a sampling clock to sample the received audio signals. The clock divider and/or de jitter circuit 303 may reduce jitter in the received audio signals using various techniques such as packet buffering, buffering delay, filtering, signal stabilization, and/or jitter estimation. In some embodiments, adaptive de-jittering may be used by the clock divider and/or de jitter circuit 303 to allow the lengths of silence periods to be adjusted to compensate for jitter. The clock divider and/or de jitter circuit 303 may provide a sampling clock to the audio sampling circuit 304 that samples the received audio signals. The audio sampling circuit 304 may sample audio signal received by acoustic-electric transducer/microphone 305.

Figure 4:
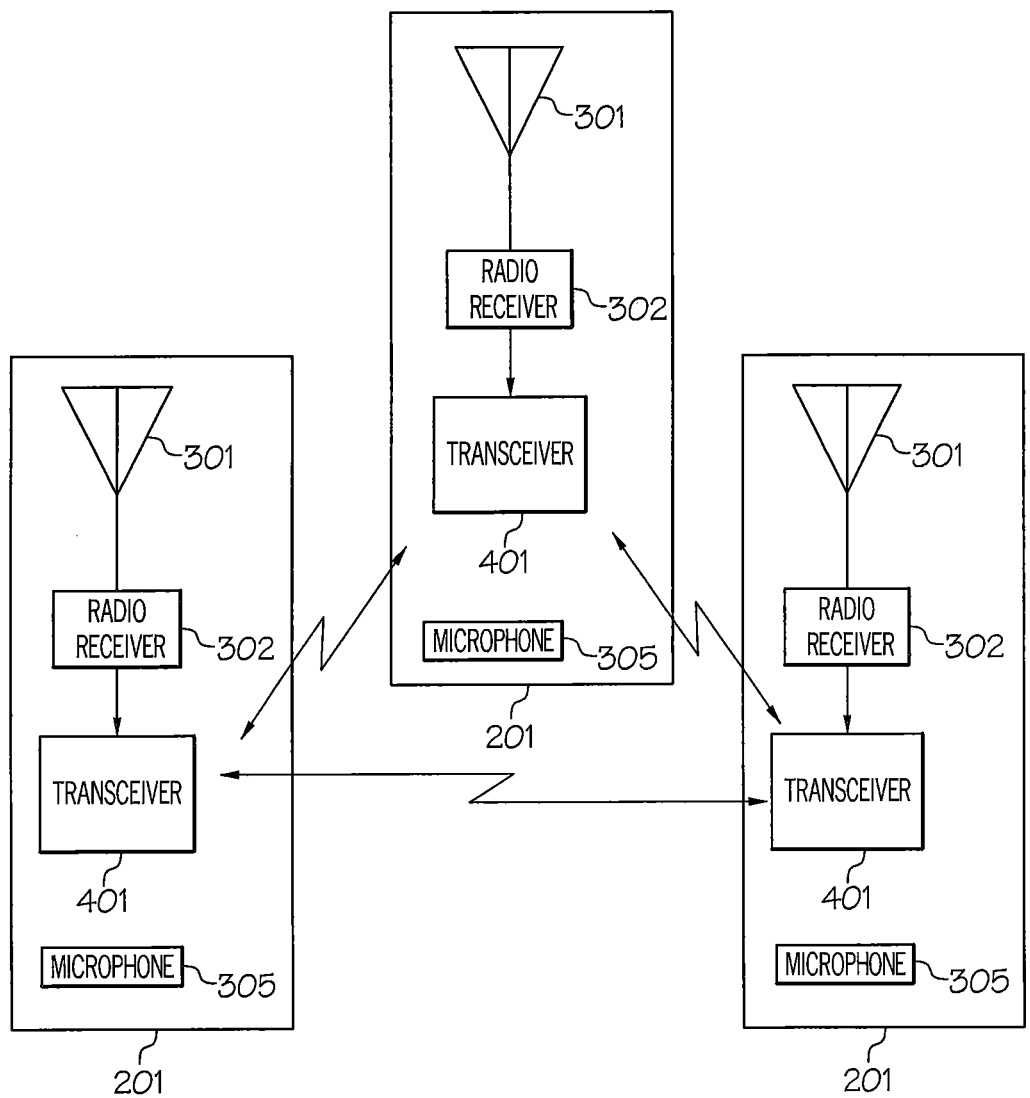
FIGS. 4 and 5 illustrate a plurality of microphone devices, according to various embodiments described herein.

Referring now to FIG. 4, two or more microphone devices 201 of FIGS. 2 and 3 may communicate with one another. For example, a transceiver 401 of the microphone device 201 may have a wireless interface to communicate with one or more other microphone devices 201. In some embodiments, the transceiver 401 may include the functionality of the clock divider and/or de jitter circuit 303 of FIG. 3. The transceivers 401 may communicate clock information such an identity of a common clock source, a clock divider value, and/or de jitter information.

Figure 5:
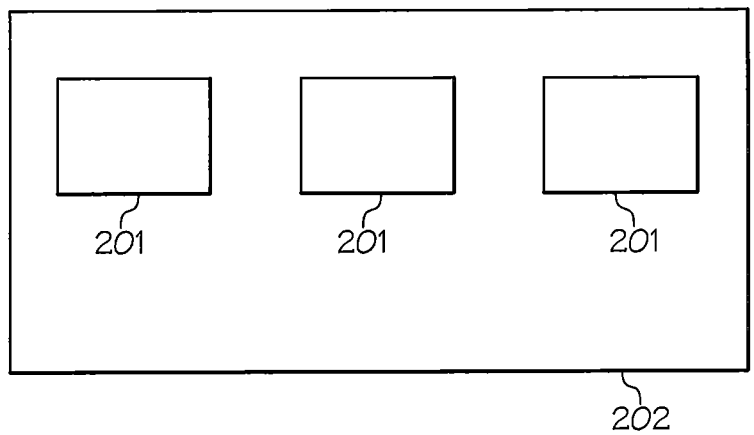

The sampling clocks used by each of the microphone devices 201 may need to be synchronized such that all of the microphone devices 201 sample audio signals with the same clock frequency. Referring now to FIG. 5, two or more microphone devices 201 may be in an environment 202 of the performance venue. Each of the microphone devices 201 may use a local oscillator for sampling the audio signals. However, each of the local oscillators may drift in frequency due to tolerances or temperature effects. To improve the recorded audio quality, the sampling clocks of the microphone devices 201 may be synchronized. To accomplish synchronization of the microphone devices 201, existing radio signals in the environment 501 of the performance venue may be used. For example, signals such as Frequency Modulation (FM), Amplitude Modulation (AM), Global Navigation Satellite System (GNSS), Global System for Mobile Communication (GSM), Global Positioning System (GPS), Universal Mobile Telecommunications System (UMTS), and/or Long Term Evolution (LTE) are available in most populated locations around the world. Each of the microphone devices 201 may listen for these commonly available radio signals and select a common radio signal on which to base sampling of the audio signals. In some embodiments, a dedicated synchronization beacon may be used as the common radio signal for the microphone devices 201.

According to some embodiments, once powered on, each of the microphone devices 201 searches for existing radio signals in the environment 501. The microphone devices 201 negotiate with other microphone devices 201 within communication range to determine a suitable carrier frequency based on a common existing radio signal. Communication between microphone devices 201 may occur, for example, over Wi-Fi or Bluetooth frequencies. Additional microphone devices 201 may join the negotiation at discrete points in time. In some embodiments, the microphone devices 201 may make a common radio signal search based upon a user request. These results of the common radio signal search may be presented to the user, such that the user may select the common radio signal to use. These results may be presented to the user within a specialized application or in a browser. The microphone devices 201 may have a built-in web server to facilitate user communication. In some embodiments, the negotiation for a common radio signal between microphone devices 201 may be done automatically once triggered by the user, but not started upon powering on a microphone device 201. In some embodiments, the microphone devices 201 may be pre-configured by the user to listen for a certain existing radio frequency signal such as, for example FM 107 MHz.

Figure 6:
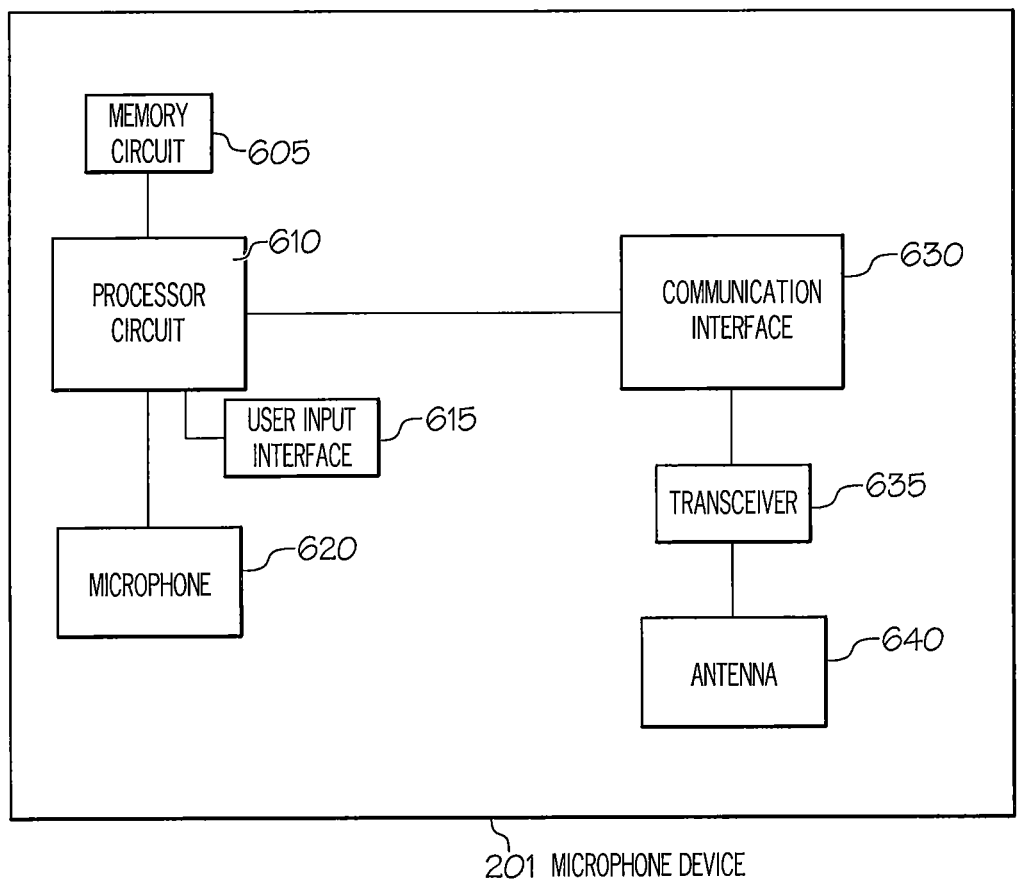
FIG. 6 is a block diagram of a microphone device, according to various embodiments described herein.

FIG. 6 is a block diagram of a microphone device 201. Referring now to FIG. 6, microphone device 201 may include a microphone 620 for receiving audio signals. The microphone device 201 may include a user input interface 615 to send and/or receive information from a user. A memory circuit 605 may be coupled to the processor circuit 610. The antenna 640 may be coupled to a transceiver circuit 635 which is, in turn, coupled to a communication interface 630. The communication interface 630 may facilitate communication via protocols such as Wi-Fi or Bluetooth to other microphone devices. The communication interface 630 may be coupled to a processor circuit 610 that samples audio signals, processes audio samples, negotiates clock dividers, etc. As will be discussed in further detail with reference to FIGS. 7 to 27.

Figure 7:
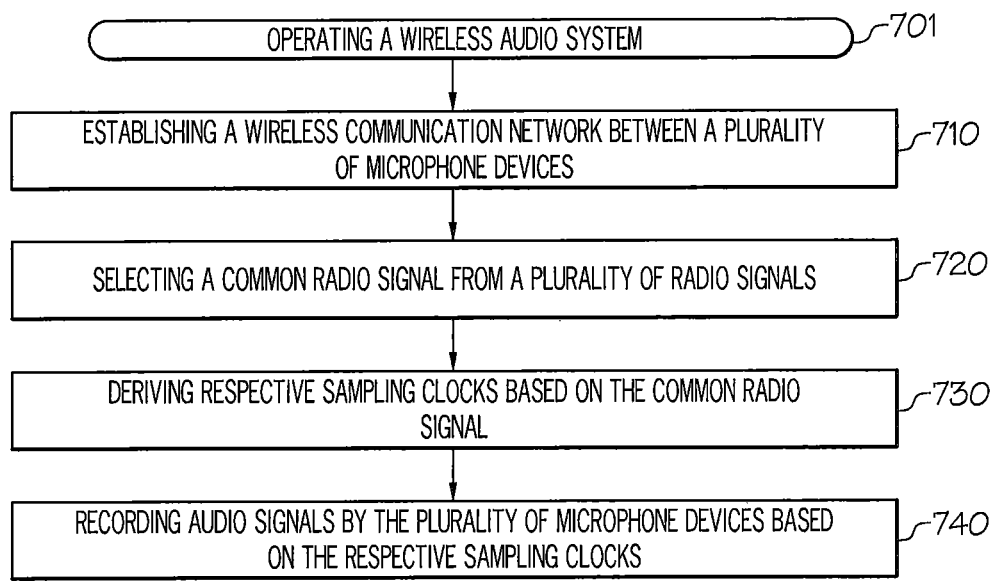
FIGS. 7 to 21 are flowcharts of operations of a wireless audio system, according to various embodiments described herein.

FIGS. 7 to 21 are flowcharts of operations 701 of a wireless audio system, according to various embodiments. Referring now to FIG. 7, at block 710, a wireless communication network may be established between a plurality of microphone devices 201 of any of FIGS. 2 to 6. The wireless communication network facilitates negotiation between the microphone devices 201 to determine a common radio signal to use for deriving sampling clocks. At block 720, a common radio signal is selected from a plurality of radio signals available in the environment. At block 730, respective sampling clocks are derived by the microphone devices 201 based on the common radio signal that was selected at block 720. At block 740, the audio signals are recorded by the microphone devices 201 based on the respective sampling clocks derived at block 730.

Figure 8:
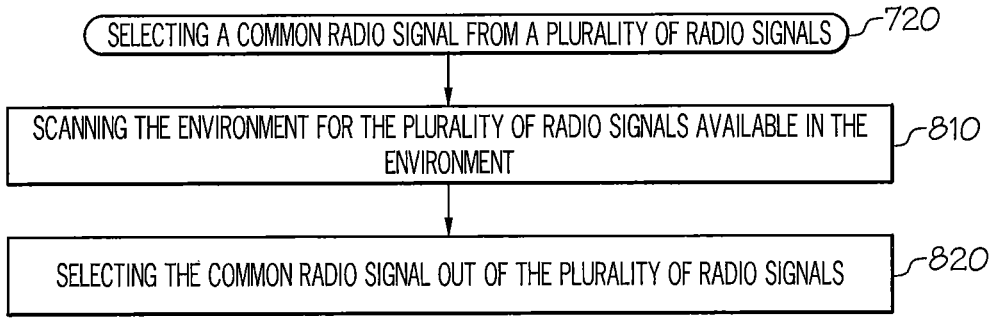
Figure 9:
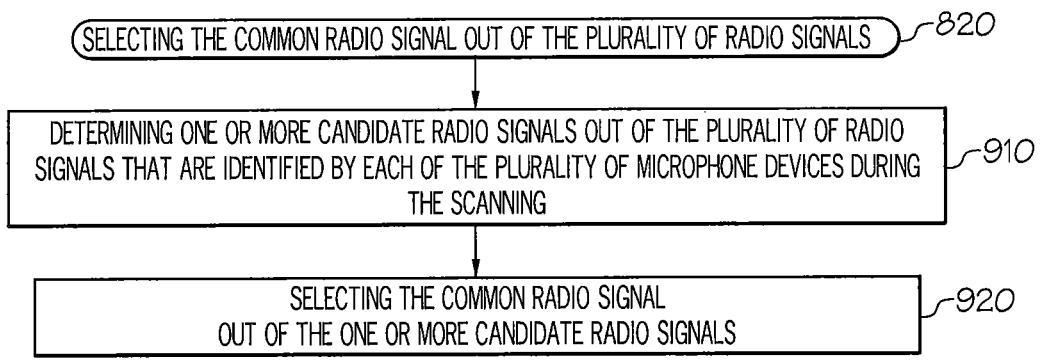

Referring now to FIG. 8, selecting a common radio signal from a plurality of radio signals as in block 720 of FIG. 7, may include scanning the environment for the plurality of radio signals available in the environment at block 810. A common radio signal is selected out of the plurality of radio signals at block 820. Referring now to FIG. 9, selecting the common radio signal out of the plurality of radio signals at block 820 may include determining one or more candidate radio signals out of the plurality of radio signals that are identified by each of the microphone devices during scanning, at block 910. Determining the candidate radio signals may include qualifying the radio signals based on signal characteristics such as signal strength or signal quality. The common radio signal may be selected out of the one or more candidate radio signals that are available to the microphone devices 201, at block 920.

Figure 10:
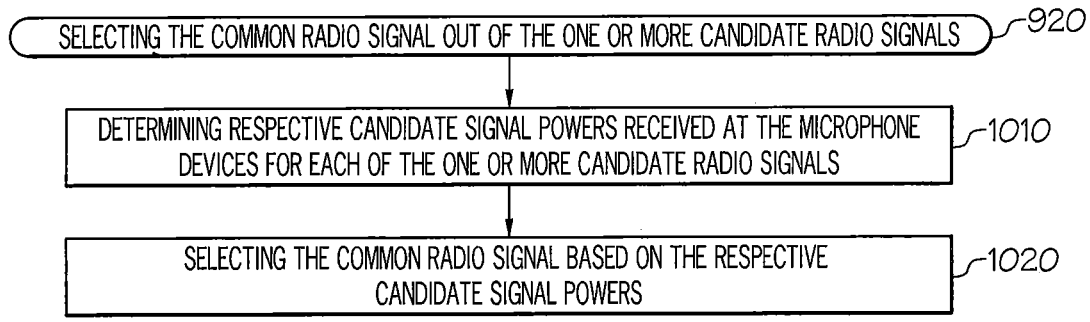

Referring now to FIG. 10, selecting the common radio signal out of the one or more candidate radio signals at block 920 of FIG. 9 may include determining respective candidate signal powers received at the microphone devices for each of the one or more candidate radio signals, at block 1010. The candidate signal power may be determined by measuring the received signal strength of the candidate radio signal at the microphone device. The common radio signal may be selected based on the respective candidate signal powers, at block 1020. For example, if three different candidate radio signals are under consideration, the signal power received at each microphone device 201 may be measured. In some embodiments, the signal powers for a given candidate radio signal may be summed across all of the microphone device is 201 to obtain a total signal power for the given candidate radio signal. The candidate radio signal with the highest total signal power may be selected as the common radio signal for use by the microphone devices 201 to derive sampling clocks.

Figure 11:
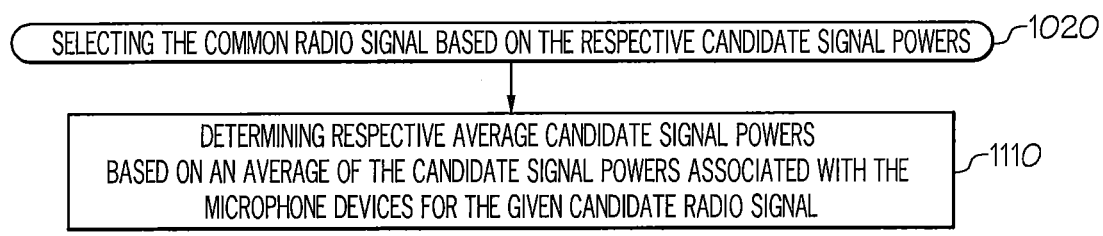
Figure 12:
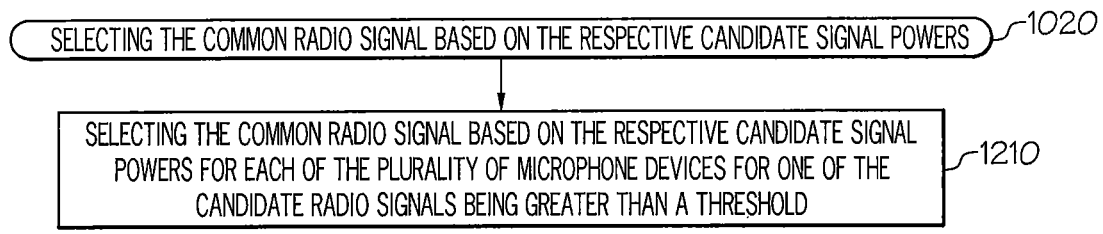

Referring now to FIG. 11, in some embodiments, selecting the common radio signal based on the respective candidate signal powers of block 1020 of FIG. 10 may include determining respective average candidate signal powers based on an average of the candidate signal powers associated with the microphone devices 201 for the given candidate radio signal, at block 1110. For example, for each candidate signal, the received signal power is measured for each of the microphone devices and averaged to obtain the average signal power for each of the candidate signals. The common radio signal may be selected to be the candidate signal with the highest average signal power across the microphone devices. Referring now to FIG. 12, in some embodiments, selecting the common radio signal based on the respective candidate signal powers of block 1020 of FIG. 10 may include selecting the common radio signal based on the respective candidate signal powers for each of the microphone devices 201 being greater then a threshold. This ensures that each microphone receives the common radio signal at some signal strength greater than the threshold signal power.

Figure 13:
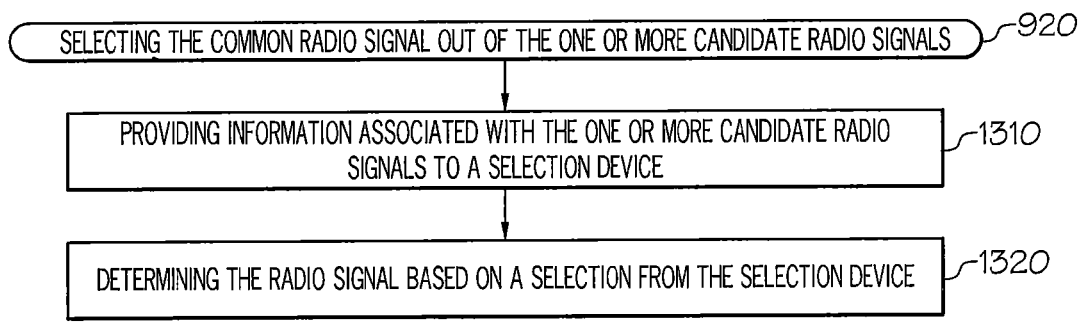

Referring now to FIG. 13, in some embodiments, selecting the common radio signal out of the one or more candidate radio signals at block 920 of FIG. 9 may include providing information associated with one or more candidate radio signals to a selection device, at block 1310. The selection device may include a user device such as a smart phone, computer, or tablet used for controlling the wireless audio system. The user may select a candidate radio signal for use as the common radio signal for deriving sampling clocks by some or all of the microphone devices. The radio signal used may be determined based on the selection from the user device at block 1320.

Figure 14:
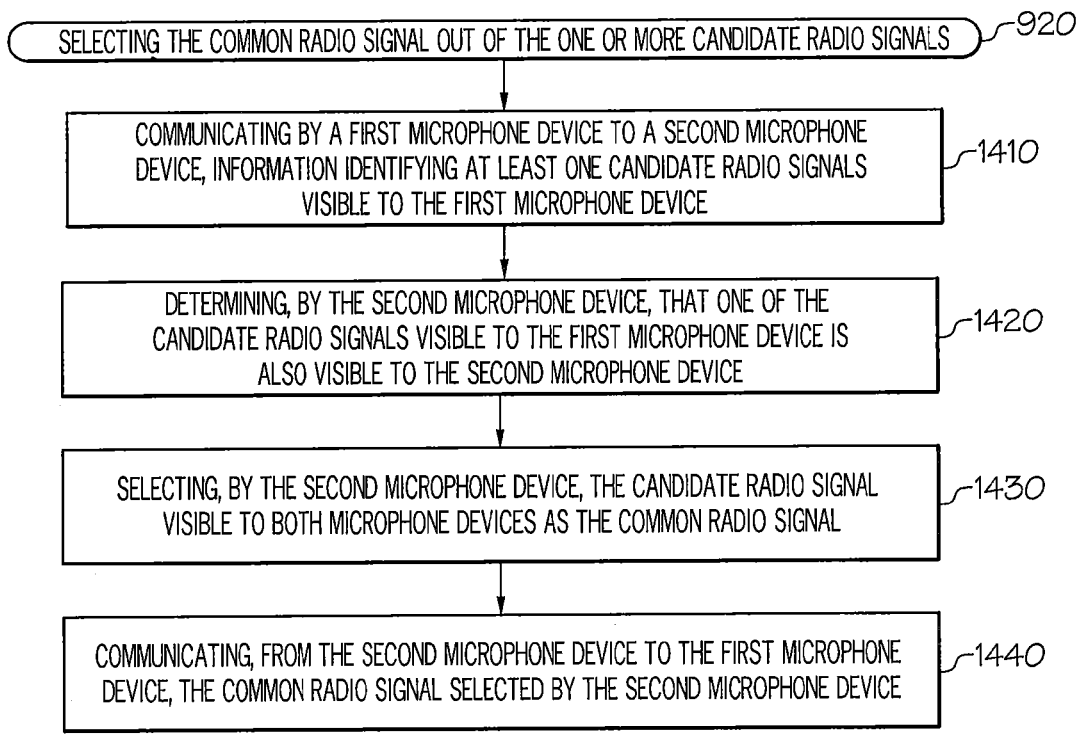

Referring now to FIG. 14, in some embodiments, selecting the common radio signal out of the one or more candidate radio signals at block 920 of FIG. 9 may include communicating by a first microphone device to a second microphone device information identifying at least one of the candidate radio signals visible to the first microphone device, at block 1410. The second microphone device may determine that one of the candidate radio signals visible to the first microphone device is also visible to the second microphone device at block 1420. The second microphone device may select the candidate radio signal that is visible to both microphone devices as the common radio signal, at block 1430. The second microphone device may communicate to the first microphone device the common radio signal selected by the second microphone device, at block 1440. Communication between microphones may occur over a wireless communication network using Wi-Fi, Bluetooth, or other communication protocols. In some embodiment, a user device such as a computer or smart phone may behave as a central hub or router and facilitate communication between microphone devices.

Figure 15:
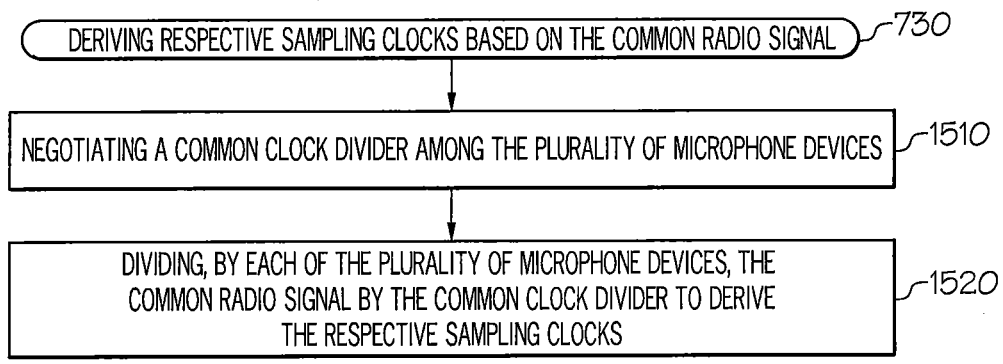
Figure 16:
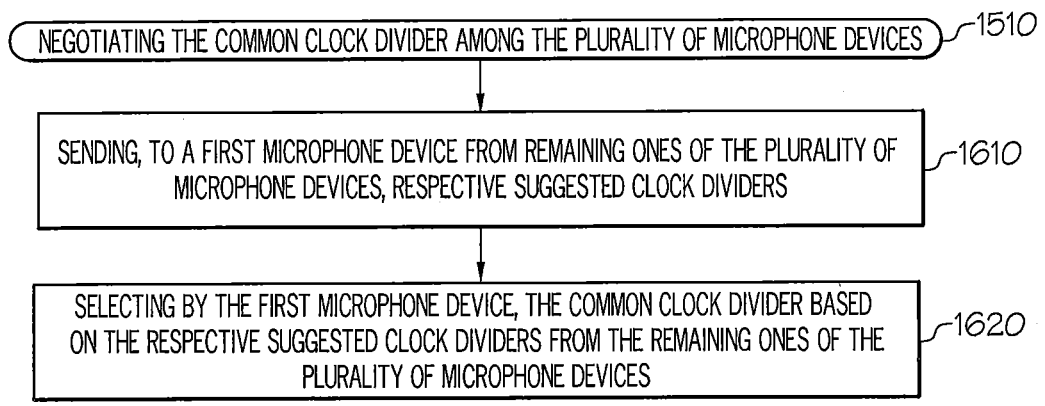

Referring now to FIG. 15, deriving respective sampling clocks based on the common radio signal at block 730 of FIG. 7 may include negotiating a common clock divider for use by the plurality of microphone devices, at block 1510. Once the common clock divider is negotiated, each of the microphone devices may divide the common radio signal by the common clock divider to derive their respective sampling clocks, at block 1520. Referring now to FIG. 16, negotiating the common clock divider among the microphone devices at block 1510 may include sending to a first microphone device, from the other microphone devices, suggested clock dividers, at block 1610. In some embodiments, the first microphone device may behave as a master node in a peer-to-peer network and select the common clock divider based on the suggested clock dividers from the other microphone devices, at block 1620.

Figure 17:
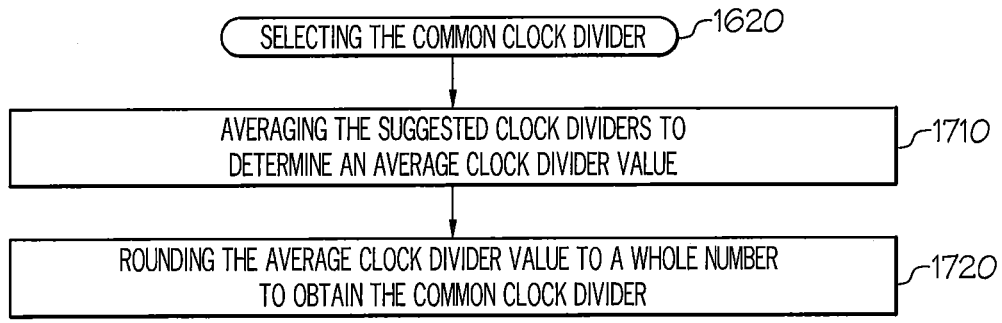
Figure 18:
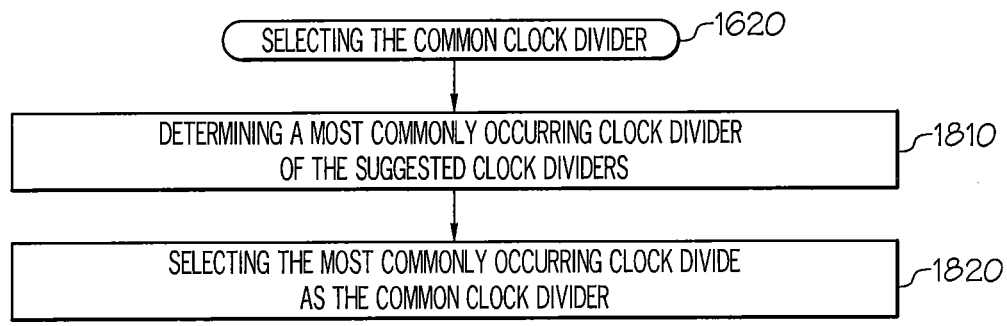

The common clock divider may be selected, at block 1620 using a variety of criterion such as averaging and/or selecting a mathematical mode of the suggested clock divider values. Referring now to FIG. 17, in some embodiments, the suggested clock dividers may be averaged to determine an average clock divider value, at block 1710. If the average clock divider value is not a whole number, it may be rounded to a whole number to derive the common clock divider, at block 1720. Referring now to FIG. 18, the common clock divider may be selected by determining a most frequently occurring clock divider of the suggested clock dividers, at block 1810. The most often occurring clock divider may be selected as the common clock divider, at block 1820. In other words, a clock divider that is most frequently selected by the microphone devices may be used as the common clock divider.

Figure 19:
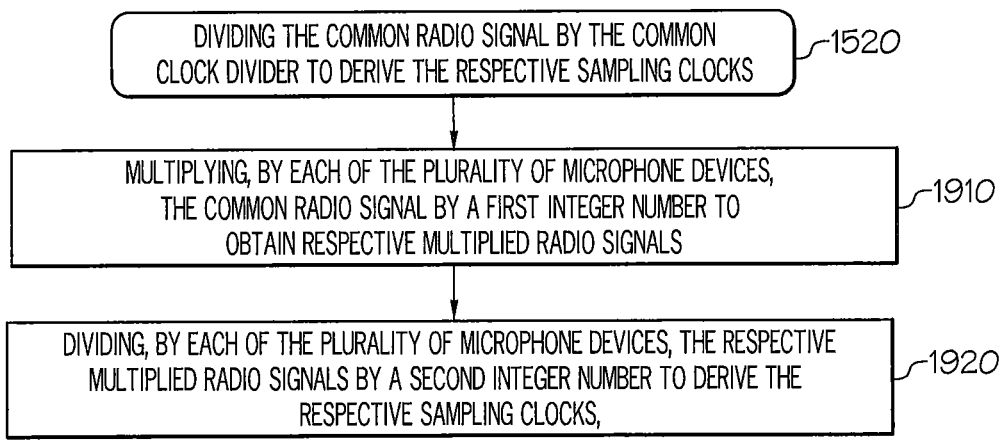

In some cases, simple clock division may not be accurate enough to obtain a suitable common sampling clock. Referring now to FIG. 19, the common radio signal may be divided by the common clock divider to obtain the respective sampling clocks at block 1520 by scaling by a ratio. The scaling by a ratio may include multiplying, the common radio signal, by a first integer to obtain a multiplied radio signal, at block 1910. In some embodiments, multiplying may be accomplished using a phase-locked loop. The multiplied radio signal, may be divided by a second integer to derive the respective sampling clock, at block 1920. In this case, the common clock divider is the ratio of the first integer to the second integer. This procedure may be repeated for each of the microphone devices. In some embodiments, radio signals occurring in the environment may not provide a suitable frequency for deriving the clock. In this case, an electric field based on the building power grid, usually occurring at 50 Hz or 60 Hz may be used. A phase-locked loop may then be used to multiply the 50 Hz or 60 Hz signal to generate a higher rate sampling clock such as one at 48 kHz. In other words, the common radio signal may be multiplied instead of divided to obtain a higher sampling rate.

Figure 20:
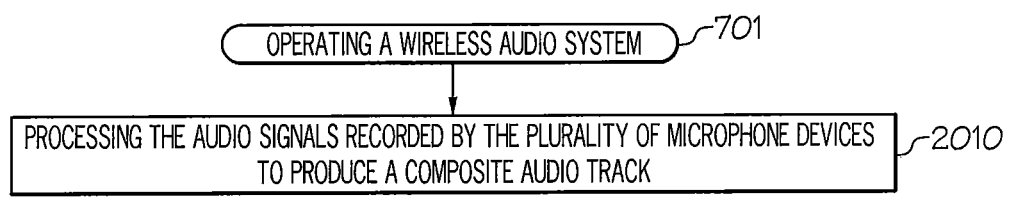
Figure 21:
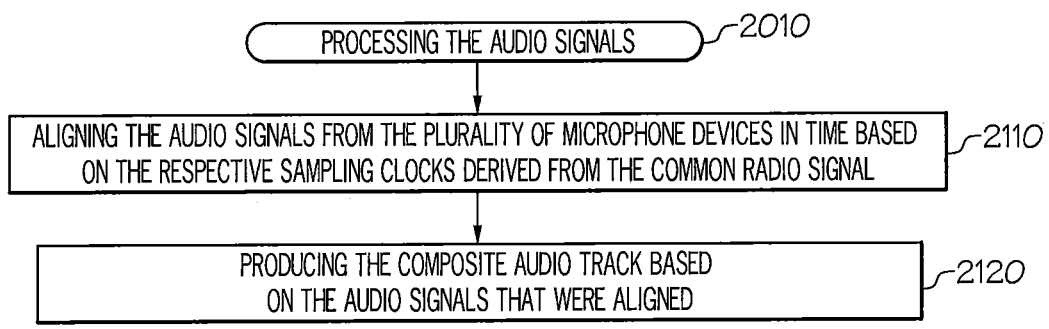

The audio signal may be sampled using the sampling clock to produce an audio track. A single/mono audio track may be produced in the case of mono-microphone, corresponding to a single audio channel. In the case of a stereo microphone or a surround microphone, two or more audio tracks may be produced, which may correspond to two or more audio channels. Audio tracks may be stored in the memory circuit 605 of FIG. 6 in the microphone device and/or stored in a memory location accessible to the microphone device across the wireless network. Post-processing of the audio tracks obtained by the various microphone devices may be done in order to produce a high-quality audio signal that is representative of the performance. Post-processing may be done via an application on the user device and/or using a separate software program that runs on a computer or other computing device. Referring now to FIG. 20, the audio signals recorded by the various microphone devices may be processed to produce a composite audio track, at block 2010. Referring now to FIG. 21, processing the audio signals of block 2010 of FIG. 20 may include aligning the audio signals from the various microphone devices in time based on the respective sampling clocks derived from the common radio signal, at block 2110. The composite audio track may be produced based on the audio signals that were aligned, at block 2120. This composite audio track may be a high-quality stereo signal since it is a conglomeration of audio signals sampled by various microphones.

Figure 22:
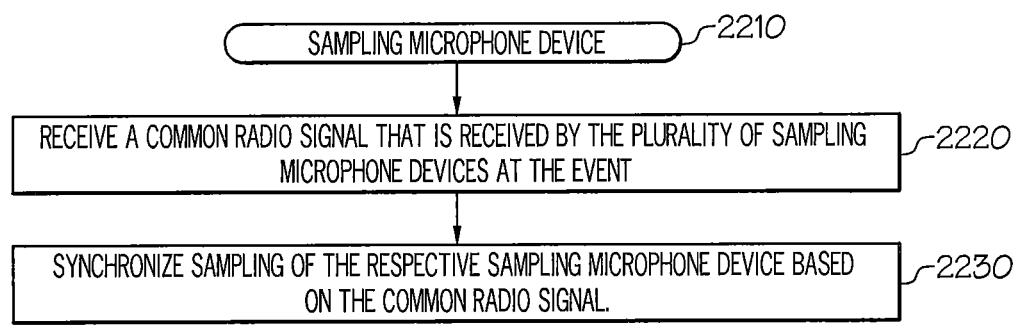
FIGS. 22 to 25 are flowcharts of operations performed by a sampling microphone device, according to various embodiments described herein.

FIGS. 22 to 25 are flowcharts of operations performed by a sampling microphone device, according to various embodiments. The sampling microphone device may be similar to the microphone devices of FIGS. 2 to 6. Referring now to FIG. 22, the sampling microphone device may receive a common radio signal that is received by the plurality of sampling microphone devices at the event or performance, at block 2220. Sampling of the respective sampling microphone device may be synchronized based on the common radio signal, at block 2230.

Figure 23:
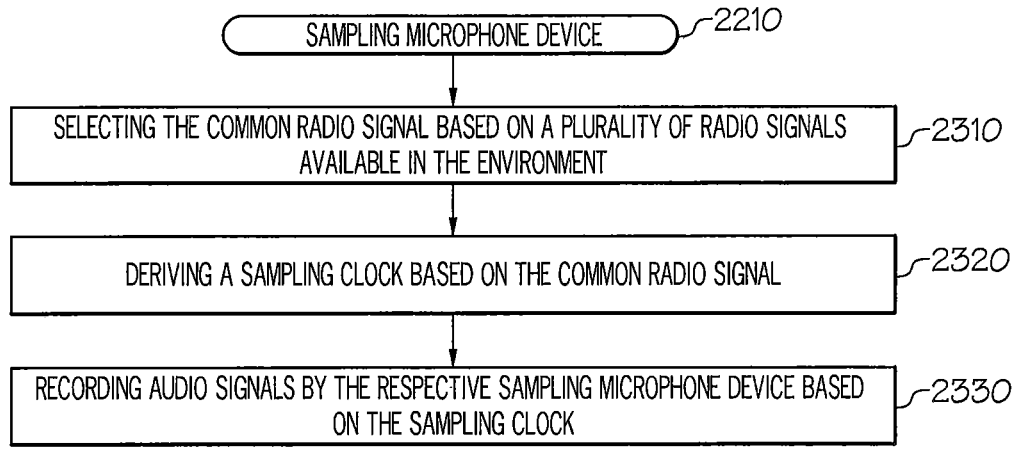

Referring now to FIG. 23, the common radio signal may be selected based on a plurality of radio signals available in the environment, at block 2310. A sampling clock may be derived based on the common radio signal, at block 2320. Audio signals may be recorded by the sampling microphone device based on the sampling clock, at block 2330. Recorded audio signals may be stored in the microphone device 201 of FIG. 6 in memory circuit 605 or at a location accessible across the network.

Figure 24:
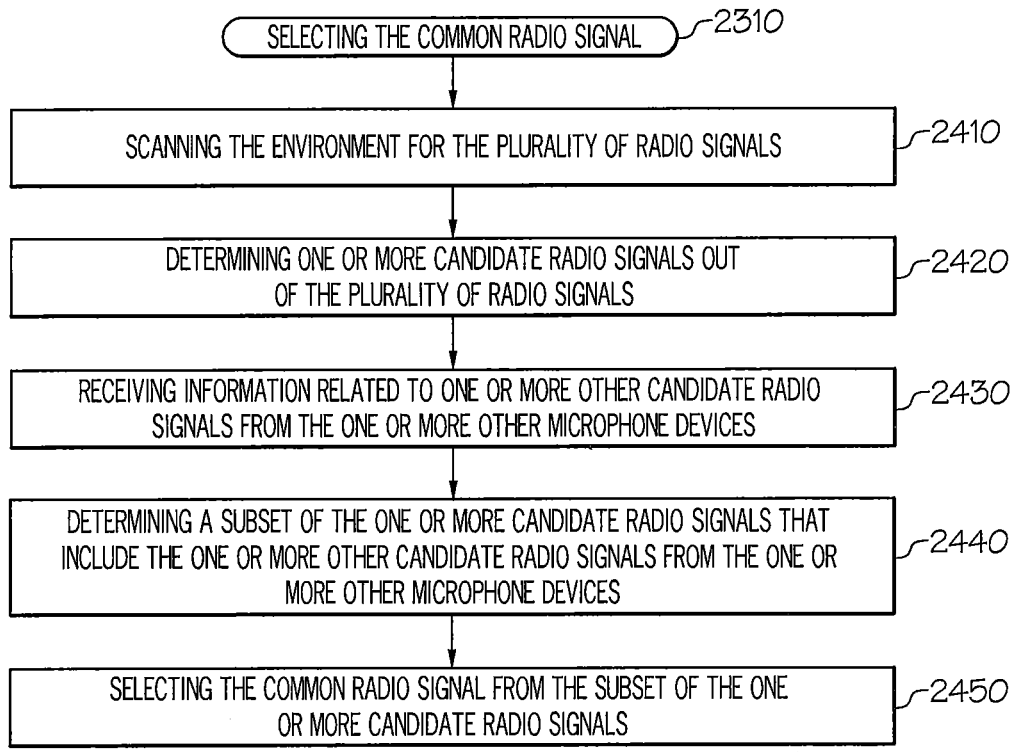

In some embodiments, the sampling microphone device may behave as a master node in a peer-to-peer network. In this case, the sampling microphone device, based on radio signals detected by other sampling microphone devices, selects the common radio signal for use by the microphone devices in the peer-to-peer network. Referring now to FIG. 24, selecting the common radio signal of block 2310 of FIG. 23 may include scanning the environment for a plurality of radio signals at block 2410. One or more candidate radio signals may be determined out of the radio signals that are available in the environment, at block 2420. Information related to one or more candidate radio signals may be received from one or more of the other microphone devices, at block 2430. A subset of the one or more candidate radio signals may be determined, at block 2440. The subset of the candidate radio signals include candidate radio signals that are available to the other microphone devices. The common radio signal may be selected from the subset of the one or more candidate radio signals, at block 2450.

Figure 25:
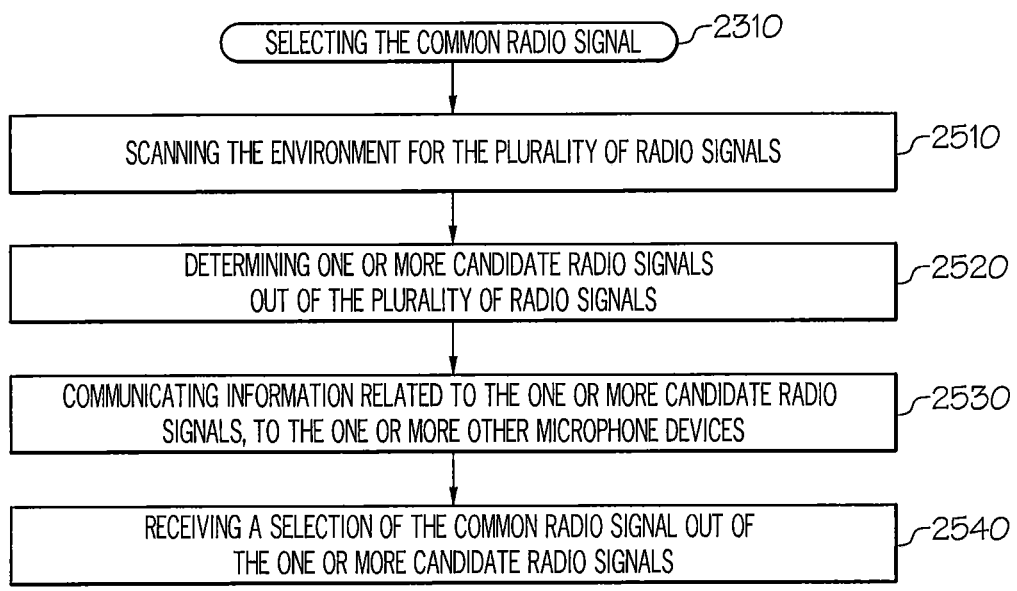

In some embodiments, the sampling microphone device may behave as a slave node in a peer-to-peer network. In this case, a peer sampling microphone device decides which of the radio signals available in the environment is used as the common radio signal. Referring now to FIG. 25, selecting the common radio signal at block 2310 of FIG. 23, may include scanning the environment for the radio signals that are available, at block 2510. One or more candidate radio signals may be determined out of the radio signals available in the environment, at block 2520. Information related to one or more candidate radio signals may be communicated to the other microphone devices, at block 2530. The selection of the common radio signal may be received from another sampling microphone device, at block 2540.

Figure 26:
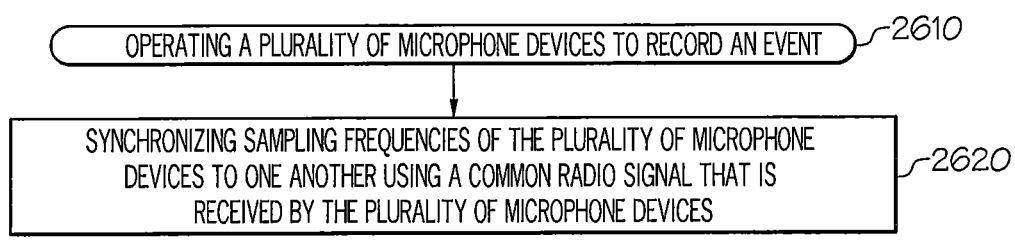
FIGS. 26 to 27 are flowcharts of operations performed by a plurality of microphone devices to record an event, according to various embodiments described herein.
Figure 27:
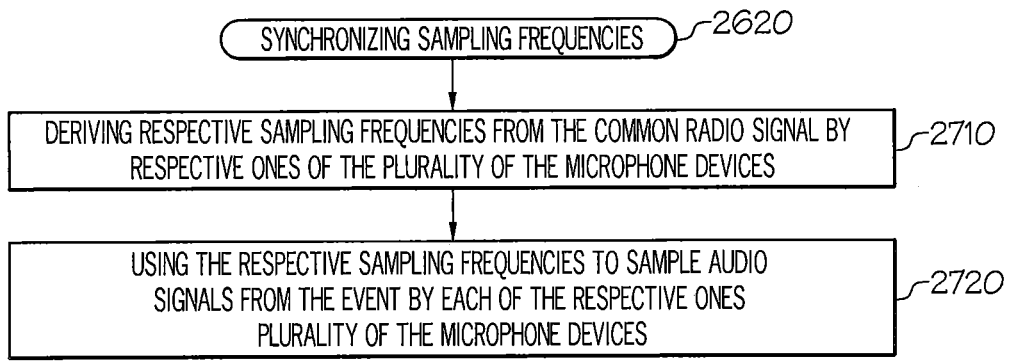

FIGS. 26 to 27 are flowcharts of operations performed by a plurality of microphone devices to record an event, according to various embodiments. Referring now to FIG. 26, several microphone devices may be operating to record audio of an event, at block 2610. The sampling frequency of the microphone devices may be synchronized to one another using a common radio signal that is received by the plurality of microphone devices, at block 2620. Referring now to FIG. 27, synchronizing the sampling frequencies of block 2620 of FIG. 26 may include deriving sampling frequencies from the common radio signal by each of the microphone devices, at block 2710. The respective sampling frequencies may be used by each of the microphone devices to sample audio signals from the event, at block 2720.

According to some embodiments described herein, a user that wants to record the audio of a performance or event may place several microphone devices at various locations around the performance venue. Each of the microphones may sample and/or record the audio signals using a common reference clock. Once the various audio streams that are recorded are processed, a high-quality audio signal may be produced. The effects of audio reflections such as a "muddy" sound that is evident when a conventional microphone is not in an optimal location are thus minimized. In some embodiments, one or more of the microphone devices may be placed in locations to sample ambient noise or other interference and may be used to cancel out these erratic sounds in the audio stream. The noise cancelling microphone devices may derive a sampling clock based on the common radio signal in order to sample the noise. In some embodiments, the microphone devices may be capable of streaming audio in real time with low latency such that the microphone devices may be used for a public announcement (PA) system. The microphone devices may not have an attached microphone in the housing but provide a connector to interface to a standard microphone or to a lavalier microphone.

Various embodiments were described herein with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

It will be understood that, when an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Furthermore, "coupled", "connected", "responsive", or variants thereof as used herein may include wirelessly coupled, connected, or responsive. Like numbers refer to like elements throughout. The terminology used herein is for the purpose of describing particular embodiments only and is not intended to be limiting of the invention. As used herein, the singular forms "a", "an" and "the" are intended to include the plural forms as well, unless the context clearly indicates otherwise. Well-known functions or constructions may not be described in detail for brevity and/or clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. Moreover, as used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

For purposes of illustration and explanation only, various embodiments of the present invention were described herein in the context of receivers that are configured to receive audio and/or other radio signals. It will be understood, however, that the present invention is not limited to such embodiments and may be embodied generally in any wireless communication terminal that is configured to transmit and receive according to one or more radio access technologies.

As used herein, the terms "user equipment", "user device", or the like, includes cellular and/or satellite radiotelephone(s) with or without a display (text/graphical); Personal Communications System (PCS) terminal(s) that may combine a radiotelephone with data processing, facsimile and/or data communications capabilities; Personal Digital Assistant(s) (PDA) or smart phone(s) that can include a radio frequency transceiver and a pager, Internet/Intranet access, Web browser, organizer, calendar and/or a global positioning system (GPS) receiver; and/or conventional laptop (notebook) and/or palmtop (netbook) computer(s) or other appliance(s), which include a radio frequency transceiver. Finally, the term "node" includes any fixed, portable and/or transportable device that is configured to communicate with one or more user equipment/devices and/or a core network.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof.

Example embodiments were described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by processor circuitry. These computer program instructions may be provided to processor circuitry of a general purpose computer circuit, special purpose computer circuit such as a digital processor, and/or other programmable data processor circuit to produce a machine, such that the instructions, which execute via the processor circuitry of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). These computer program instructions may also be stored in a computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks.

Accordingly, embodiments of the present invention may be embodied in hardware and/or in software (including firmware, resident software, micro-code, etc.) that runs on a processor such as a digital signal processor, which may collectively be referred to as "processor circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments were disclosed herein, in connection with the following description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A method of operating a wireless audio system, the method comprising:
   establishing a wireless communication network between a plurality of microphone devices in an environment;
   selecting a common radio signal used by the plurality of microphone devices from a plurality of radio signals available in the environment;
   deriving respective sampling clocks for sampling audio signals for recording by respective ones of the plurality of microphone devices, based on the common radio signal; and
   recording the audio signals by the respective ones of the plurality of microphone devices based on sampling the audio signals by the respective sampling clocks.

2. The method of claim 1, wherein the selecting the common radio signal comprises:
   scanning the environment, by each of the plurality of microphone devices, for the plurality of radio signals available in the environment; and
   selecting the common radio signal out of the plurality of radio signals.

3. The method of claim 2, wherein the selecting the common radio signal out of the plurality of radio signals comprises:
   determining one or more candidate radio signals out of the plurality of radio signals that are identified by each of the plurality of microphone devices during the scanning; and
   selecting the common radio signal out of the one or more candidate radio signals.

4. The method of claim 3, wherein the selecting the common radio signal out of the one or more candidate radio signals comprises:
   determining respective candidate signal powers received at respective ones of the plurality of microphone devices for each of the one or more candidate radio signals; and
   selecting the common radio signal based on the respective candidate signal powers.

5. The method of claim 4, wherein the selecting the common radio signal based on the respective candidate signal powers comprises:
   determining respective average candidate signal powers associated with respective ones of the one or more candidate radio signals, wherein one of the respective average candidate signal powers for a given candidate radio signal is based on an average of the candidate signal powers associated with ones of the plurality of microphone devices for the given candidate radio signal.

6. The method of claim 4, wherein the selecting the common radio signal based on the respective candidate signal powers further comprises:
   selecting the common radio signal based on the respective candidate signal powers for each of the plurality of microphone devices for one of the one or more candidate radio signals being greater than a threshold.

7. The method of claim 3, wherein the selecting the common radio signal out of the one or more candidate radio signals further comprises:
   providing, to a selection device, information associated with the one or more candidate radio signals; and
   determining the radio signal based on a selection from the selection device.

8. The method of claim 3, wherein the selecting the common radio signal out of the one or more candidate radio signals further comprises:
   communicating, using the wireless communication network, by a first microphone device of the plurality of microphone devices to a second microphone device of the plurality of microphone devices, information identifying at least one of the one or more candidate radio signals visible to the first microphone device, based on the scanning the environment;
   determining, by the second microphone device, that one of the at least one of the one or more candidate radio signals visible to the first microphone device is also visible to the second microphone device;
   selecting, by the second microphone device, the one of the at least one of the one or more candidate radio signals as the common radio signal; and
   communicating, from the second microphone device to the first microphone device, the common radio signal selected by the second microphone device.

9. The method of claim 1, wherein the deriving the respective sampling clocks by respective ones of the plurality of microphone devices based on the common radio signal comprises:
   negotiating, over the wireless communication network, a common clock divider among the plurality of microphone devices; and
   dividing, by each of the plurality of microphone devices, the common radio signal by the common clock divider to derive the respective sampling clocks.

10. The method of claim 9, wherein the negotiating the common clock divider among the plurality of microphone devices comprises:
    sending, to a first microphone device of the plurality of microphone devices, from remaining ones of the plurality of microphone devices, respective suggested clock dividers; and
    selecting by the first microphone device, the common clock divider based on the respective suggested clock dividers from the remaining ones of the plurality of microphone devices.

11. The method of claim 10, wherein the selecting the common clock divider comprises:
averaging the suggested clock dividers to determine an average clock divider value; and
rounding the average clock divider value to a whole number to obtain the common clock divider.

12. The method of claim 10, wherein the selecting the common clock divider comprises:
determining a most commonly occurring clock divider of the suggested clock dividers; and
selecting the most commonly occurring clock divide as the common clock divider.

13. The method of claim 9, wherein the dividing the common radio signal by the common clock divider to derive the respective sampling clocks comprises:
multiplying, by each of the plurality of microphone devices, the common radio signal by a first integer to obtain respective multiplied radio signals; and
dividing, by each of the plurality of microphone devices, the respective multiplied radio signals by a second integer to derive the respective sampling clocks,
wherein the common clock divider is a ratio of the first integer to the second integer.

14. The method of claim 1, further comprising:
processing the audio signals recorded by the respective ones of the plurality of microphone devices to produce a composite audio track.

15. The method of claim 14, wherein processing the audio signals comprises:
aligning the audio signals from the plurality of microphone devices in time based on the respective sampling clocks derived from the common radio signal; and
producing the composite audio track based on the audio signals that were aligned.

16. A system for recording an event, the system comprising:
a plurality of sampling microphone devices, a respective sampling microphone device of the plurality of sampling microphone devices comprising:
a communication interface configured to communicate via a wireless communication network to one or more other sampling microphone devices in an environment; and
a processor that is coupled to the communication interface and is configured to perform operations comprising:
receiving a common radio signal that is received by the plurality of sampling microphone devices at the event,
selecting the common radio signal based on a plurality of radio signals available in the environment;
synchronizing sampling of the respective sampling microphone device based on the common radio signal; and
deriving a sampling clock based on the synchronizing sampling of the respective sampling microphone device; and
recording audio signals by the respective sampling microphone device based on the sampling clock.

17. The system for recording an event of claim 16, wherein the selecting the common radio signal comprises:
scanning the environment for the plurality of radio signals available in the environment;
determining one or more candidate radio signals out of the plurality of radio signals;
receiving, by the communication interface, information related to one or more other candidate radio signals, from the one or more other microphone devices;
determining a subset of the one or more candidate radio signals that include the one or more other candidate radio signals from the one or more other microphone devices; and
selecting the common radio signal from the subset of the one or more candidate radio signals.

18. The sampling microphone device of claim 16, wherein the selecting the common radio signal comprises:
scanning the environment for the plurality of radio signals available in the environment;
determining one or more candidate radio signals out of the plurality of radio signals;
communicating, using the communication interface, information related to the one or more candidate radio signals, to the one or more other microphone devices; and
receiving a selection of the common radio signal out of the one or more candidate radio signals.

19. A method of operating a plurality of microphone devices that are in an environment to record an event, the method comprising:
synchronizing sampling frequencies of the plurality of microphone devices to one another using a common radio signal that is received by the plurality of microphone devices;
wherein the synchronizing sampling frequencies comprises:
deriving respective sampling frequencies from the common radio signal by respective ones of the plurality of the microphone devices;
using the respective sampling frequencies to record audio signals by the respective ones of the plurality of microphone devices based on sampling audio signals from the event.

* * * * *